3,829,321
STABLE ASPHALT-POLYOLEFIN EMULSIONS
Gene N. Woodruff, Bartlesville, Okla., assignor to
Phillips Petroleum Company
No Drawing. Filed Apr. 3, 1972, Ser. No. 240,793
Int. Cl. C08h *13/08;* C08k *1/62*
U.S. Cl. 106—277      2 Claims

ABSTRACT OF THE DISCLOSURE

Stable oil-in-water emulsions containing asphalt and a polyolefin are prepared using acidified kaolin clays, which emulsions after curing result in flexible products useful as roofing cement, pond liners, sealants, and the like. If desired, the emulsions can also comprise N,N-dimethylsulfenyl dithiocarbamates which are effective as rodent repellents.

---

This invention relates to emulsions and to their preparation. In accordance with another aspect, this invention relates to stable oil-in-water asphalt emulsions containing a polyolefin. In accordance with a further aspect, this invention relates to the use of acidified clay slurries as dispersants for preparing asphalt-polyolefin emulsions. In accordance with a further aspect, this invention relates to a process for the production of stable oil-in-water asphalt-polyolefin emulsions by the addition of molten asphalt and polyolefin to heated acidified kaolin clay. In accordance with a further aspect, this invention relates to cured products useful as roofing cements, pond liners and sealants formed from stable oil-in-water asphalt-polyolefin emulsions using acidified kaolin clay as a dispersing agent.

Accordingly, an object of this invention is to provide stable oil-in-water emulsions of asphalt containing a polyolefin.

A further object of this invention is to provide stable oil-in-water asphaltic emulsions containing a rodent repellent.

A further object of this invention is to provide an improved method for forming stable oil-in-water asphaltic emulsions containing a polyolefin.

Other aspects, objects and the several advantages of this invention will be readily apparent to those skilled in the art upon reference to the following description and the appended claims.

According to the invention, stable oil-in-water emulsions containing asphalt and a polyolefin are prepared by the use of an acidified kaolin clay slurry as a dispersant for preparing the emulsion.

In accordance wtih one embodiment of the invention, stable oil-in-water emulsions containing asphalt and a polyolefin are prepared by adding a blend of molten asphalt and polyolefin to an acidified aqueous slurry of a kaolin clay which is at an elevated temperature somewhat less than the temperature of the blend of asphalt and polyolefin.

In accordance with a further embodiment of the invention, the stable oil-in-water emulsions containing asphalt and a polyolefin are prepared using an acidified aqueous slurry of a kaolin clay as a dispersing agent.

Further in accordance with the invention, a rodent repellent comprising N,N-dimethylsulfenyl dithiocarbamates are added to the above-prepared stable oil-in-water emulsions, which emulsions after curing can be utilized as a coating for protecting various surfaces against attack by rodents and roaches.

The asphalts that can be used in the preparation of these emulsions include any of those bituminous materials used heretofore and known in the prior art such as natural asphalts or those derived from petroleum refining, for example, by steam refining, vacuum distillation, and/or air blowing and the like. Asphalts characterized by penetrations (ASTM D-5-61) from 0 to about 400 at 77° F. or even higher, and preferably from about 60 to 200 at 77° F., and having softening points (ASTM D-36-26) in the range of 90 to 250° F., and preferably 100 to 150° F., represent suitable asphalts that can be used.

Waxy polyolefins having a melt index (ASTM D-1238-65) of at least 100 can be used. Polymers of mono-1-olefins having from 2 to 8 carbon atoms per molecule, preferably polymers of ethylene or propylene, including both homopolymers and copolymers can be used. The homopolymers may be partially oxidized or chlorinated. Any emulsifiable polymer can be used.

The melt index is inversely related to molecular weight. Therefore, low molecular weight polymers are preferred.

As indicated above, an acidified kaolin clay is used as the dispersing agent. The clay should be finely divided, passing through a 325-mesh screen. Fine kaolin clay particles of about 2 microns are preferred.

The rodent repellents that can be incorporated into the emulsions of the invention are N,N-dimethylsulfenyl dithiocarbamates. Specific N,N-dimethylsulfenyl dithiocarbamate compounds applicable are N,N-dimethyl-S-methylsulfenyl dithiocarbamate and N,N-dimethyl-S-tert-butylsulfenyl dithiocarbamate.

The dithiocarbamate compounds of the invention can be prepared by any convenient method. One method for the preparation of said compounds comprises reacting an alkali metal salt of an N-substituted dithiocarbamate with an aliphatic sulfenyl thiocyanate. Further details regarding preparation of the dithiocarbamate compounds can be found in U.S. Pat. No. 2,390,713 and U.S. Pat. No. 2,862,850.

The amount of dithiocarbamate present in the emulsions of the invention set forth in more detail hereinbelow range from 0.5 weight percent to 20 weight percent, preferably 1 to 10 weight percent.

In preparing the kalolin clay for blending with the asphalt and polyolefin it is desirable to acidify the clay prior to blending with the other ingredients.

Acids such as hydrochloric acid, sulfuric acid, acetic acid, or sulfamic acid can be used to impart an acid pH below 7 to the emulsion. Generally, pH's in the range of 2 to about 6.5, preferably 3 to 5, are suitable for these acidic emulsions. The amount of the acid will generally be 0.1 to about 1 weight percent of the emulsion.

The relative amounts of the various components of the emulsions can vary appreciably, but in general will have the following compositions:

RANGES OF COMPONENTS
(In weight percent)

|  | Clay | Asphalt | Polyolefin | Water |
|---|---|---|---|---|
| Broad | 5-18 | 10-35 | 0.5-10 | 37-84.5 |
| Preferred | 7-12 | 20-30 | 1-5 | 53-82 |

In the preparation of the stable oil-in-water emulsions of the invention in order to achieve stability of the emulsion, a blend of the asphalt and polyolefin is added to the acidified clay to form the oil-in-water emulsion. It has been found that an emulsion is not formed by adding acidified clay in the form of a slurry to a blend of the asphalt and polyolefin.

In carrying out the invention it is desirable to form a blend of molten asphalt and polyolefin which can be prepared by heating the two either in the presence or absence of a solvent to form a blend of the two materials containing up to about 30 weight percent polyolefin. It should be understood that usual equipment utilized for blending of viscous materials can be used. The asphalt-polyolefin blend is generally heated to a temperature of about 250 to 300° F. whereas the acidified clay-water slurry to which the asphalt-polyolefin blend is added is heated to a temperature in the range of about 150 to 200° F. Best results are obtained by adding the asphalt-polyolefin blend slowly and with agitation to the clay slurry.

Any means known in the art can be used to prepare these emulsions, such as by hand stirring, slow speed mechanical stirring, colloid mill, homogenizer, ultrasonics, etc.

After preparation of the emulsion the resulting product can be subjected to ambient or elevated temperatures to cure the mixture and form a flexible product which is inert to water and has various uses. Temperatures in the range 100 to 150° F. can be used to speed up the cure rate.

EXAMPLE I

A stable emulsion was formed with polyethylene, asphalt and kaloin clay by pouring a hot polyethylene-asphalt melt into a hot stirring kaolin clay slurry. In this run, 77.1 grams Allied Chemical Corp. AC–629 polyethylene (M.P. 213–221° F.; sp. gr. 0.93) was melted and blended with 211.8 grams melted 90 penetration asphalt. The blend was maintained at a temperature of 290° F. and the blend was poured slowly into a stirring slurry of 50 grams kaolin clay, one gram concentrated HCl, and 300 grams water until 181.8 grams of the asphalt-polyethylene blend was added. The temperature of the clay slurry was about 170° F. and the temperature of the final product was about 170° F.

The resulting emulsion was stirred slowly for 15 minutes and allowed to cool to room temperature. A smooth and stable emulsion resulted.

The cured product comprises asphalt, polyethylene and kaolin clay.

EXAMPLE II

In this example, stable clay-asphalt emulsions containing both polyethylene and a rodent repellent were prepared. The use of both asphalt and polyethylene permits a selection of properties in the dry product (containing rodent repellent) that is not possible with the use of asphalt alone or polyethylene alone. Additionally, the addition of polyethylene to the asphalt is effective in decreasing the effect of water on the cured dried product.

In these runs, R–55 rodent repellent (tert-butyl sulfenyl dimethyl dithiocarbamate) was emulsified with AC–629 polyethylene and 85/100 asphalt using acidified clay slurries without the use of other emulsifiers.

The compositions of the emulsions and the results are set forth below in Table I.

TABLE I

| Run number | 1 | 2 | 2 |
|---|---|---|---|
| Composition total emulsion: | | | |
| Water | 63.50 | 64.06 | 57.48 |
| Dresser clay (kaolin clay) | 11.45 | 11.55 | 10.70 |
| Concentrated HCL | 0.25 | 0.26 | 0.20 |
| Asphalt 85/100 | 23.20 | 21.30 | 27.20 |
| AC 629 polyethylene | 1.33 | 2.60 | 4.10 |
| R–55 | 0.27 | 0.23 | 0.32 |
| Total | 100.00 | 100.00 | 100.00 |
| Cured Product composition: | | | |
| Clay | 31.60 | 32 38 | 25.34 |
| Asphalt 85/100 | 64.00 | 59.70 | 64.10 |
| AC 629 polyethylene | 3.66 | 7.28 | 9.80 |
| R–55 | 0.74 | 0.64 | 0.76 |
| Total | 100.00 | 100.00 | 100.00 |
| Emulsion | Stable | Stable | Stable |
| Composition ashalt blend: | | | |
| Asphalt 85/100 | 93.5 | 88.28 | 85.9 |
| AC 629 polyethylene | 5.4 | 10.77 | 13.1 |
| R–55 | 1.1 | 0.95 | 1.9 |
| Total | 100.00 | 100.00 | 100.00 |
| Gram asphalt blend used | 195.0 | 188.5 | 206.6 |
| Asphalt blend temperature, °F | 270 | 270 | 285 |
| Slurry temperature, °F | 170 | 170 | 185 |

EXAMPLE III

Additional runs were carried out according to the invention whereby additional emulsions and the emulsions of Table I were cured and placed in water for a prolonged period of time to determine the effect on the asphalt and clay. In these runs, cured emulsion samples, with and without polyethylene, were placed in water for an extended period of time.

In the preparation of the clay-asphalt emulsions, the asphalt blend at 270–285° F. was poured slowly into the stirring slurry of clay, water and HCl at 170–185° F. Temperatures for each run are shown in Table II.

The prepared emulsions were spread evenly to uniform thickness on aluminum foil and cured at ambient temperature (about 75° F.) for two days. The aluminum foil was then cut into 1" x 2" strips. These 1" x 2" strips of cured emulsion on aluminum foil were placed in about 200 ml. water. The cured emulsions adhere to the foil and are black, firm and pliable.

In Table II, the emusions for Runs 6–8 correspond to the emulsions for Runs 1–3, respectively, in Table I.

TABLE II

| Run number | 4 | 5 | 6 | 7 | 8 |
|---|---|---|---|---|---|
| Emulsion composition: | | | | | |
| Dresser clay | 9.70 | 9.70 | 11.45 | 11.55 | 10.70 |
| Water | 54.06 | 54.06 | 63.50 | 64.06 | 57.48 |
| Concentrated HCl | 0.14 | 0.14 | 0.25 | 0.26 | 0.20 |
| 85/100 asphalt | 36.10 | 36.10 | 23.20 | 21.30 | 27.20 |
| AC 629 polyethylene | | | 1.33 | 2.60 | 4.10 |
| R–55 | | | 0.27 | 0.23 | 0.32 |
| Total | 100.00 | 100.00 | 100.00 | 100.00 | 100.00 |
| Asphalt blend temperature, °F | 275 | 275 | 270 | 270 | 285 |
| Slurry temperature, °F | 175 | 175 | 170 | 170 | 185 |
| Cured product composition: | | | | | |
| Dresser clay | 21–2 | 21.2 | 31.60 | 32.38 | 25.34 |
| 85/100 asphalt | 78.8 | 78.8 | 64.00 | 59.70 | 64.10 |
| AC 629 polyethylene | | | 3.66 | 7.28 | 9.80 |
| R–55 | | | 0.74 | 0.64 | 0.76 |
| Total | 100.00 | 100.00 | 100.00 | 100.00 | 100.00 |

Observations:
Large amount light brown solids in the water.
Trace of white flocculent solid material in the water.
Trace of white solid material in the water.

The cured asphalt products containing no polyethylene (Runs 4 and 5) contained a large amount of precipitated light brown solid material in the water, while the cured asphalt products containing polyethylene (Runs 6–8) showed no brown solids and only a trace of flocculent material white in color in the water. The observations noted above in Table II were after a 4½-month soaking period.

It is apparent that the cured clay asphalt product was eroded (extracted) by the water where polyethylene was not present (Runs 4 and 5), while the use of 3.66–9.75 percent polyethylene (based on cured product) prevented the erosion of the clay. The amount of precipitated solids in the water of the cured asphalt products without polyethylene was at least ten times as great as the solids in the water of the cured asphalt products with polyethylene after 4½ months' soaking period. After a one-year soaking period, the amount of precipitated solids in the water of the cured asphalt products without polyethylene was at least 100 times as great as the precipitated solids in the water of the cured asphalt products with polyethylene.

The asphalt emulsions with polyethylene also contained rodent repellent which demonstrates that polyethylene improves the water resistance of asphalt emulsions containing a small amount of rodent repellent.

I claim:
1. A flexible, water resistant, cured product formed on heating to remove water from a stable oil-in-water emulsion having a pH in the range 2–6.5 and consisting essentially of:

(a) 10–35 weight percent asphalt having a penetration in the range 0 to 400 at 77° F. and a softening point in the range 90 to 250° F.,
(b) 5–18 weight percent acidified kaolin clay having a particle size such that it passes through a 325-mesh screen,
(c) 0.5–10 weight percent of a polyethylene having a melting point of 213–221° F. and a specific gravity of 0.93, and
(d) 37–84.5 weight percent acidic water.

2. The cured product of claim 1 in which said emulsion has a pH in the range 3–5 and contains
(a) 20–30 weight percent of said asphalt,
(b) 7–12 weight percent of said acidified kaolin clay,
(c) 1–5 weight percent of said polyethylene, and
(d) 53–82 weight percent acidic water.

References Cited

UNITED STATES PATENTS

| | | | |
|---|---|---|---|
| 1,049,916 | 1/1913 | Raschig | 106—277 |
| 2,714,582 | 8/1955 | Day | 106—277 X |
| 3,336,146 | 8/1965 | Henschel | 106—277 |
| 3,497,371 | 2/1970 | Chang | 106—277 |
| 3,567,476 | 3/1971 | Masciantonio et al. | 106—277 |
| 3,615,798 | 10/1971 | Woodruff | 106—277 |
| 3,676,198 | 7/1972 | McGroarty | 260—28.5 AS |
| 2,862,850 | 12/1958 | Goodhue. | |

FOREIGN PATENTS 797,681  7/1958  Great Britain _____ 106—277

OTHER REFERENCES

Hackh's Chemical Dictionary, 4th edition, revised and edited by Julius Grant, published by McGraw-Hill Book Co., New York, (pp. 283, 369, 437–8 relied on).

JOSEPH L. SCHOFER, Primary Examiner

H. J. LILLING, Assistant Examiner

U.S. Cl. X.R.

106—15; 117—138.8 A, 161 UZ, 168; 252—311.5; 260—28.5 AS